United States Patent
Bloom

(10) Patent No.: US 7,136,585 B2
(45) Date of Patent: Nov. 14, 2006

(54) OPTICAL AMPLIFIERS IN A FREE SPACE LASER COMMUNICATION SYSTEM

(75) Inventor: Scott Harris Bloom, Encinitas, CA (US)

(73) Assignee: Kiribati Wireless Ventures, LLC, Las Vegas, NV (US)

( * ) Notice: Subject to any disclaimer, the term of this patent is extended or adjusted under 35 U.S.C. 154(b) by 691 days.

(21) Appl. No.: 10/023,320

(22) Filed: Dec. 14, 2001

(65) Prior Publication Data
US 2004/0208593 A1     Oct. 21, 2004

(51) Int. Cl.
 *H04B 10/08*     (2006.01)
(52) U.S. Cl. ............. 398/37; 398/60; 398/67; 398/79
(58) Field of Classification Search ......... 398/126, 398/67, 79, 37, 160; 385/37, 24; 359/333–349; 372/50, 22
See application file for complete search history.

(56) References Cited

U.S. PATENT DOCUMENTS

| | | | |
|---|---|---|---|
| 4,100,472 A | | 7/1978 | Mobley |
| 4,616,898 A | | 10/1986 | Hicks, Jr. |
| 4,882,774 A | | 11/1989 | Grotzinger |
| 4,949,056 A | * | 8/1990 | Akkapeddi ............ 359/334 |
| 5,060,304 A | | 10/1991 | Solinsky |
| 5,276,703 A | | 1/1994 | Budin et al. |
| 5,347,387 A | | 9/1994 | Rice |
| 5,457,557 A | | 10/1995 | Zarem et al. |
| 5,710,652 A | | 1/1998 | Bloom et al. |
| RE35,736 E | | 2/1998 | Powell et al. |
| 5,786,923 A | | 7/1998 | Doucet et al. |
| 5,822,099 A | | 10/1998 | Takamatsu |
| 6,016,313 A | | 1/2000 | Foster, Jr. et al. |
| 6,049,593 A | | 4/2000 | Acampora |
| 6,104,513 A | | 8/2000 | Bloom |
| 6,163,636 A | | 12/2000 | Stentz et al. |
| 6,198,531 B1 | * | 3/2001 | Myrick et al. ........... 356/300 |
| 6,229,788 B1 | | 5/2001 | Graves et al. |
| 6,239,888 B1 | | 5/2001 | Willebrand |
| 6,256,296 B1 | | 7/2001 | Ruziak et al. |
| 6,266,464 B1 | * | 7/2001 | Day et al. ............... 385/37 |
| 6,285,481 B1 | | 9/2001 | Palmer |
| 6,356,384 B1 | * | 3/2002 | Islam ..................... 359/334 |

(Continued)

FOREIGN PATENT DOCUMENTS

EP       0 607 906       7/1994

(Continued)

OTHER PUBLICATIONS

Kwong, et al., *Coherent-Detection of Narrow-Linewidth Millimeter-wave and Microwave Subcarrier Signals for Future Mobile/Personal Communications*, Proceedings of the Military communications conference, Long Branch, NJ., 3:940-944 (1994).

(Continued)

*Primary Examiner*—David C. Payne

(57) ABSTRACT

Disclosed is a novel free space optical communication system comprising an optical amplifier configured to amplify an optical signal received from a fiber optic cable, a transmitter coupled to the optical amplifier and configured to transmit the amplified optical signal across a free space medium. The system also includes a receiver configured to receive the attenuated optical signal and a second optical amplifier coupled to the receiver configured to amplify the attenuated optical signal before transmitting the optical signal on to a fiber optic cable. The optical amplifier is preferably a Raman optical amplifier, but may also be any other optical amplifier, or combination of optical amplifiers, known in the art.

21 Claims, 5 Drawing Sheets

U.S. PATENT DOCUMENTS 6,560,010 B1 * 5/2003 DiJaili et al. ............... 359/344
2002/0064340 A1 * 5/2002 Fukuchi ....................... 385/24
2002/0196506 A1 * 12/2002 Graves et al. ............. 359/172

FOREIGN PATENT DOCUMENTS

| EP | 0 749 259 | 12/1996 |
|----|-----------|---------|
| EP | 0 859 478 | 8/1998  |
| WO | WO 98/32250 | 7/1998 |

OTHER PUBLICATIONS

Bloom S. et al., *Status of BMDO/IST Lasercom Advanced Technology Demonstration*, SPIE vol. 2123 pp. 96-107.

Busch T. et al., *Overview of Laser Communication Technologies at Rome Laboratory*, SPIE vol. 2123 pp. 24-33.

* cited by examiner

OPTICAL AMPLIFIERS IN A FREE SPACE LASER COMMUNICATION SYSTEM

BACKGROUND OF THE INVENTION

Description of the Related Art

Communication through the use of optical signals is becoming increasingly prevalent in modern communication systems. In particular, the widespread use of fiber optic cables has reduced the cost and complexity of transmitting optical data, while making substantial advances in the bandwidth available to individual users. Indeed, fiber optic wire carries much more information than conventional copper wire and is far less subject to electromagnetic interference.

Recent advances in optical signal multiplexing have further increased the amount of data that may be transmitted on a single optical fiber. For example, Dense wavelength division multiplexing ("DWDM") is a technique that puts data from different sources together on an optical fiber, with each signal carried at the same time on its own separate light wavelength. Using current DWDM techniques, up to 80 (and theoretically more) separate wavelengths or channels of data can be multiplexed into a single light stream transmitted on a single optical fiber. Each channel carries a time division multiplexed (TDM) signal. In a system with each channel carrying 2.5 Gbps (billion bits per second), up to 200 billion bits can be delivered per second by the optical fiber. DWDM is also sometimes called wave division multiplexing (WDM).

Since each channel is demultiplexed at the end of the transmission back into the original source, different data formats being transmitted at different data rates can be transmitted together. For example, Internet (IP) data, Synchronous Optical Network data (SONET), and asynchronous transfer mode (ATM) data can all be travelling at the same time within the optical fiber.

While service providers rapidly upgrade their backbones to greater speeds laying more fiber and investing in signal multiplexing technologies, the portion of the network that reaches the end user remains virtually unchanged. In other words, even if the backbone of the network is high speed fiber optic, the end user connection using a telephone line, for example, cannot communicate the data at the fiber optic speeds. This phenomena is commonly referred to as the "last-mile" problem. Advances in the use of free space laser communications have already significantly reduced the last-mile phenomenon.

Free-space optics ("FSO") refers to the transmission of modulated visible or infrared (IR) beams through the atmosphere to obtain broadband communications. Laser beams in FSO systems are generally used, although non-lasing sources may also serve the purpose.

The theory of FSO is essentially the same as that for fiber optic transmission. The difference is that the energy beam is collimated and sent through clear air, or space, from the source to the destination, rather than guided through an optical fiber. If the energy source does not produce a sufficiently parallel beam to travel the required distance, collimation can be done with lenses. At the source, the visible or IR energy is modulated with the data to be transmitted. At the destination, the beam is intercepted by a photodetector, the data is extracted from the visible or IR beam (demodulated), and the resulting signal is amplified and transmitted electrically to its' destination.

FSO systems can function over distances of several kilometers. In theory, as long as there is a clear line of sight between the source and the destination, communication is possible. Even if there is no direct line of sight, strategically positioned mirrors can be used to reflect the energy. In practice, however, optical signals experience attenuation as they travel across a transmission medium. A FSO systems requires a minimum optical signal strength in order to accurately transmit the signal across free space. Therefore, in many FSO systems signal amplification is necessary before transmission of the received optical signal.

FIG. 1 illustrates a FSO transmitter which receives an input from a remote data source. Prior to transmission, and after reception of an optical signal by a FSO system, at least two, and potentially more, electrical to optical conversions are performed to get the data on to and off of the transmitter and receiver, respectively. In FIG. 1, for example, a series of conversions between optical and electrical signals are performed, in conjunction with an electrical amplification, to produce an amplified optical signal for transmission into free space.

Data source 16 represents the optical transmission point where the data is transmitted on to a fiber optic line. Data source 16 may include a router, switching node, server, or even an individual PC with an optical modem. The optical signal 20T, from data source 16, is transmitted across a long-haul network and the optical signal encounters some signal attenuation. At this point, the optical signal may be too weak to accurately transmit from FSO transmitter 14. Therefore, the optical signal must be amplified before reaching FSO transmitter 14.

According to the prior art method illustrated in FIG. 1, an optical to electrical ("O-E") conversion followed by an electrical signal amplification and then an electrical to optical ("E-O") conversion are performed to increase the optical signal strength. O-E converter 4 converts optical signal 20T into electrical signal 8A so that it may be amplified by electrical amplifier 6. Electrical amplifier 6 amplifies electrical signal 8A and outputs an amplified electrical signal 8B. E-O converter 5 converts the electrical signal 8B to optical signal 22T which may be transmitted in a FSO system. Thus, according to this system, an O-E conversion, an electrical amplification, and an E-O conversion are necessary in order to gain optical signal amplification. A FSO system that transmits an optical signal without the need for an O-E conversion, an electrical amplification, and an E-O conversion is therefore desired.

In addition, after a FSO signal is received by a FSO receiver, the signal is typically transmitted on a long haul fiber optic line. The received signal has experienced some attenuation, though, as it passed through free space between the FSO transmitter and receiver. Therefore, the received optical signal may require amplification before transmission on the fiber optic line. In a typical system this amplification is performed through a O-E conversion, an electrical amplification, and an E-O conversion, similar to that described above. These E-O and O-E conversions are expensive and cause the system to have increased complexity. In addition, they require that the individual wavelengths in a DWDM fiber be separated prior to transmission over free space.

A FSO receiver that transmits an optical signal in a fiber optic line without the need for an O-E conversion, an electrical amplification, and an E-O conversion is therefore desired.

SUMMARY OF THE INVENTION

These and other objects and features of the present invention will become more fully apparent from the following description and appended claims taken in conjunction with the following drawings, where like reference numbers indicate identical or functionally similar elements.

In one embodiment, a free space optical communication system comprises a fiber optic cable for carrying an optical signal, an optical amplifier coupled to the fiber optic cable and configured to amplify the optical signal, and a transmitter coupled to the optical amplifier and configured to transmit the amplified optical signal across a free space medium. In addition, the transmitter may include an adaptive optics system for modifying the phase of the amplified optical signal before transmitting the amplified optical signal across the free space medium.

In another embodiment, the free space optical communication system may further comprise a receiver for receiving the optical signal and an optical amplifier configured to amplify the attenuated optical signal. In addition, the system may include an adiabatic taper apparatus coupled to the receiver and configured to reduce the diameter of the attenuated optical signal. In one embodiment, the adiabatic taper apparatus reduces the diameter of the amplified attenuated optical signal by a factor of about five.

The adaptive optics system comprises an active optical element having an adjustable tip, tilt, and/or piston position and is configures so that the amplified optical signal is reflected from the active optical element before transmission across the free space medium. The adaptive optics system may also include a control module operable to control the adjustable tip, tilt, and/or piston position of the active optical element based on an atmospheric figure. The control module may also be coupled to the optical amplifier and configured to control the magnitude of optical gain by the optical amplifier In another embodiment, the adaptive optics system may also comprise a wavefront sensor configured to sense the atmospheric figure based on characteristics of the surrounding atmosphere.

In alternative embodiments, the active optical element may be one or more of the following: microelectro-mechanical systems, liquid crystal arrays, piezo electric mirrors, and deformable mirrors.

In another embodiment, the system may further comprise a dense wavelength division multiplexing (DWDM) module coupled to the fiber optic cable and configured to receive a plurality of data signals and multiplex all of the plurality of data signals into the optical signal wherein each of the plurality of signals is transmitted at a different wavelength and a dense wavelength division de-multiplexing (DWDDM) module coupled to the second optical amplifier and configured to receive and de-multiplex the amplified attenuated optical signal into the plurality of data signals.

In another embodiment, the optical amplifier is a Raman amplifier.

In another embodiment, the optical amplifier is a combination of a Raman amplifier and an Erbium-doped amplifier.

In another embodiment, the optical amplifier is a semiconductor amplifier.

In another embodiment, a free space optical communication system comprises a fiber optic cable for carrying an optical signal having a wavelength in the near IR range, a semiconductor optical amplifier coupled to the fiber optic cable and configured to amplify the optical signal, and a transmitter coupled to the semiconductor optical amplifier and configured to transmit the amplified optical signal across a free space medium. The transmitter may further comprise an adaptive optics system for modifying the phase of the amplified optical signal before transmitting the amplified optical signal across the free space medium. In one embodiment, the adaptive optics system comprises an active optical element having an adjustable tip, tilt, and piston position, the amplified optical signal is reflected from the active optical element before transmission across the free space medium and a control module operable to control the adjustable tip, tilt, and piston position of the active optical element based on an atmospheric figure.

DETAILED DESCRIPTION

The following presents a detailed description of embodiments of the invention. However, the invention can be embodied in a multitude of different ways as defined and covered by the claims. The invention is more general than the embodiments that are explicitly described, and is not limited by the specific embodiments but rather is defined by the appended claims.

Figure 1:
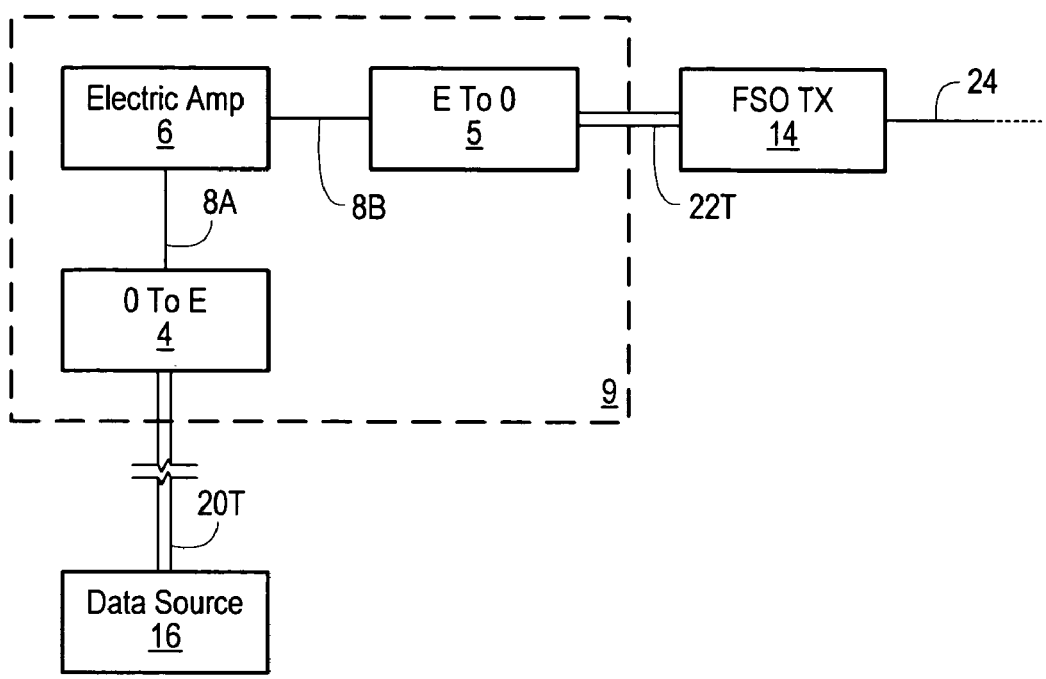
FIG. 1 illustrates a prior art FSO transmitter which receives an input from a remote data source.
Figure 2:
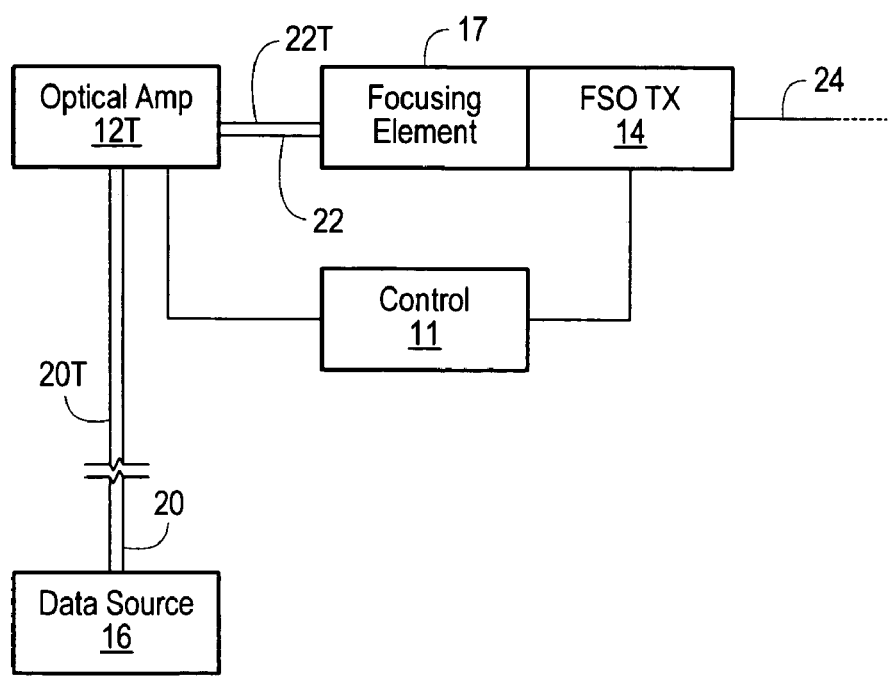
FIG. 2 is a block diagram illustrating a transmitter portion of a FSO system.

FIG. 2 is a block diagram illustrating a transmitter portion of a FSO system. Data source 16 represents the optical transmission point where the data is transmitted on to a fiber optic line. Data source 16 may include a router, switching node, server, or even an individual PC with an optical modem. As the optical signal 20T, from data source 16, is transmitted across a long-haul network, the optical signal encounters some signal attenuation, interference, scattering, and reflections. After some distance the optical signal may be too weak to accurately transmit into free space. Therefore, the optical signal must be amplified before reaching FSO transmitter 14. Optical amplifier 12 performs a purely optical (i.e., there is no conversion to an electrical signal) amplification of the optical signal 20T and an amplified optical signal 22T is transmitted to the FSO transmitter 14. Optical amplifier 12 may be one, or a combination of more than one, optical amplifier that is known in the art. For example, optical amplifier 12 may be a Raman amplifier, an Erbium doped amplifier, a semiconductor amplifier, or a combination of an Erbium doped amplifier and an Raman amplifier configured to provide optical gain over a larger bandwidth, for example. The optical amplifier 12 that is used in any particular system may be selected according to the optical signal wavelengths transmitted in the particular system. In other words, the optical amplifier, or combination of optical amplifiers, that is used in a particular FSO system may be dependant on the wavelengths of the optical data signals.

Control module 11 is coupled to the optical amplifier 12 and to the FSO transmitter 14. Control module 11 adjusts the amplification factor of the optical amplifier 12 according to factors such as the length of the optical fiber supplying signal 20T, signal attenuation, FSO transmitter characteristics, and the free space distance to the intended receiver. In addition, those skilled in the relevant art will recognize that other factors may also be considered in the determination of the optical amplification factor by control module 11. In one embodiment, optical amplifier 12 maintains a constant amplification factor, thus eliminating the need for an input from control module 11.

Control module 11 may also control an adaptive optics system that manipulates the signal immediately before the signal is received by the FSO transmitter 14. The adaptive optics system compensates for atmospheric conditions that the FSO signal 24 will encounter after transmission. Adaptive optics systems are described in detail below with reference to FIG. 5.

FSO transmitter 14 is a typical FSO transmitter, such as those designed and developed by Airfiber, Inc. In a typical FSO system, the FSO transmitter receives a signal directly from a transmit laser, modulates the signal with an adaptive optics system, if any, and transmits the optical signal on a free space medium towards a FSO receiver. However, because the input signal to FSO transmitter 14 is from a fiber optic line, instead of directly from a laser, the optical signal 22T may experience some spreading at the immediate end of the fiber. Therefore, the FSO system may include a beam focusing element 17, such as a parabolic mirror, which focuses and directs the outgoing optical signal through the FSO transmitter 14.

The system may also include one or more beam splitters or prisms for separating a portion of the optical signal for analysis. For example, a beam splitter may be used at any point after the optical amplifier 12 transmits amplified optical signal 22. The beam splitter may be configured to direct enough of the optical signal 22 towards an optical detector, i.e,. for O-E conversion, for determination of the amplified signal 22 power. This power reading may then be used as feedback to the control module 11, for example, in order to adjust the optical amplification magnitude in accordance with the current amplification needs.

In another embodiment, the optical signal contains a monitor channel that is transmitted at a wavelength just outside the standard ITU grid. Thus, the monitor channel may be easily separated from the remaining optical signal at any point in the FSO system, and used for power control, alignment, system management, or other purposes. Alternatively, a monitor channel may be included in the transmitted optical signal at a wavelength that is normally reserved for a data stream.

Figure 3:
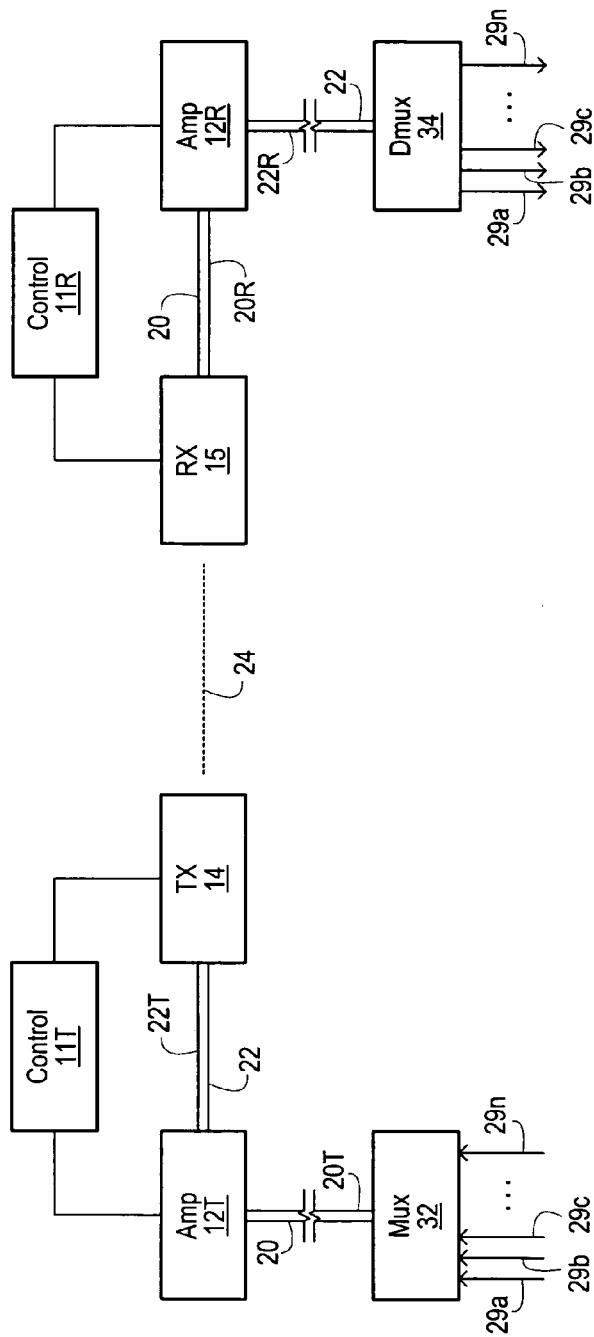
FIG. 3 is a block diagram illustrating an optical communication system including an FSO transmitter and an FSO receiver.

FIG. 3 is a block diagram illustrating an optical communication system including an FSO transmitter and an FSO receiver. In FIG. 3, a plurality of signals 29a–29n, from n different data sources, are transmitted to a multiplexor 32. The multiplexor 32 combines the signals together into a single optical signal. This optical signal 20T may then be transmitted on long haul fiber before reaching optical amplifier 12T. As discussed above, in one embodiment optical amplifier 12T amplifies the input signal 20T according to an amplification figure supplied by control module 11. The amplified signal 22T is then transmitted to FSO transmitter 14. FSO transmitter 14 transmits the received amplified signal across free space as FSO signal 24. As the amplified signal 24 travels across free space, though, it encounters some signal attenuation, interference, scattering, and reflections.

FSO receiver 15 detects the attenuated FSO signal 24 and decodes the signal. The FSO receiver 15 then transmits the decoded signal 20R onto a fiber coupled to the optical amplifier 12R, which receives the attenuated signal 20R and optically amplifies the signal. Again, in one embodiment control module 11 controls the amplification factor of optical amplifier 12R. After amplification, the output signal from amplifier 12R is capable of transmission across a fiber for a significant distance. Optical signal 22R is received by a demultiplexor 34 where the signal will be divided into its individual components 29a–29n. The use of a multiplexor 32 and demultiplexor 34 allows multiple electrical signals to be combined onto a single optical signal and increases the bandwidth of the FSO system. The multiplexor 32 and demultiplexor 34 may use, for example, DWDM modulation techniques to combine individual electrical signals 29a–29n into a single optical signal which may be transmitted across fiber optic lines and through a FSO system, as shown in FIG. 3.

Figure 4:
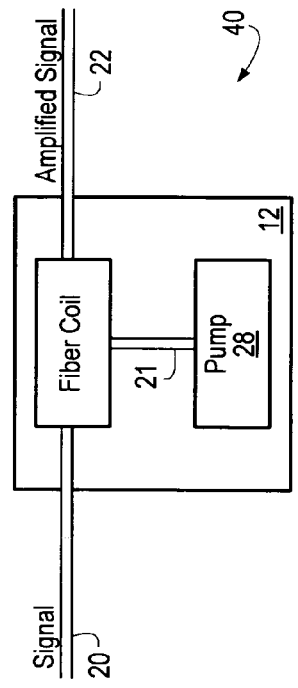
FIG. 4 is a block diagram of a Raman optical amplifier.

FIG. 4 is a block diagram of a Raman optical amplifier. Raman amplifiers take advantage of stimulated Raman scattering in order to optically amplify a signal. Stimulated Raman scattering occurs when light waves interact with molecular vibrations in a solid lattice. In simple Raman scattering, the molecule absorbs the light then quickly re-emits a photon with energy equal to the original photon, plus or minus the energy of a molecular vibration mode. This has the effect of both scattering light and shifting its wavelength. Therefore, if a strong pump signal is transmitted through the fiber along with a weak signal beam, the strong pump beam excites vibration in atoms in the fiber, and the weak signal beam stimulates those excited atoms to emit light at the signal wavelength. The result is to amplify the signal wavelength at the cost of the pump beam, which is exactly what a Raman amplifier is designed to do.

The amount of Raman gain depends on the length of the fiber as well as the pump power. A typical Raman amplifier requires about one kilometer or more of fiber in order to effectuate the desired gain. Accordingly, in FIG. 4, a fiber coil 12 receives the input signal 20 and the pump signal 21, and the amplification occurs within the fiber coil 12. The pump 28 injects the input signal 20 with a pump signal 21 at a frequency that is much higher than that of the input signal. In a Raman amplifier, the peak gain is achieved when the pump signal 21 has a frequency about 13 THz higher than the frequency of the input signal 20, or a wavelength about 100 nm shorter than the input signal 20 when the input signal 20 is near 1550 nm. One feature of Raman amplifiers is that the wavelength of operation is limited only by the availability of suitable pump sources. Therefore, assuming an unlimited pump signal wavelength and power, any optical signal wavelength may be amplified using a Raman amplifier. Raman amplifiers have been designed, constructed and tested as high-gain, low-noise optical preamplifiers for a wide range of optical signals, including DWDM signals.

In one embodiment, the optical signal 20 (FIGS. 2–6) is an optical signal with a wavelength of about 1550 nm. Optical signal 20 enters amplifier 12, which may be, for example, a Raman amplifier 40. In order to provide the maximum gain of the 1550 nm optical signal, the pump signal 21 has a wavelength of about 1450 nm. In another embodiment, the optical signal 20 is a DWDM signal including optical signals with wavelengths in the 1550 nm area. As such, maximum optical amplification by Raman amplifier 40 of all wavelengths in the 1550 nm area is again achieved using a pump signal 21 with a wavelength of about 1450 nm.

Figure 4A:
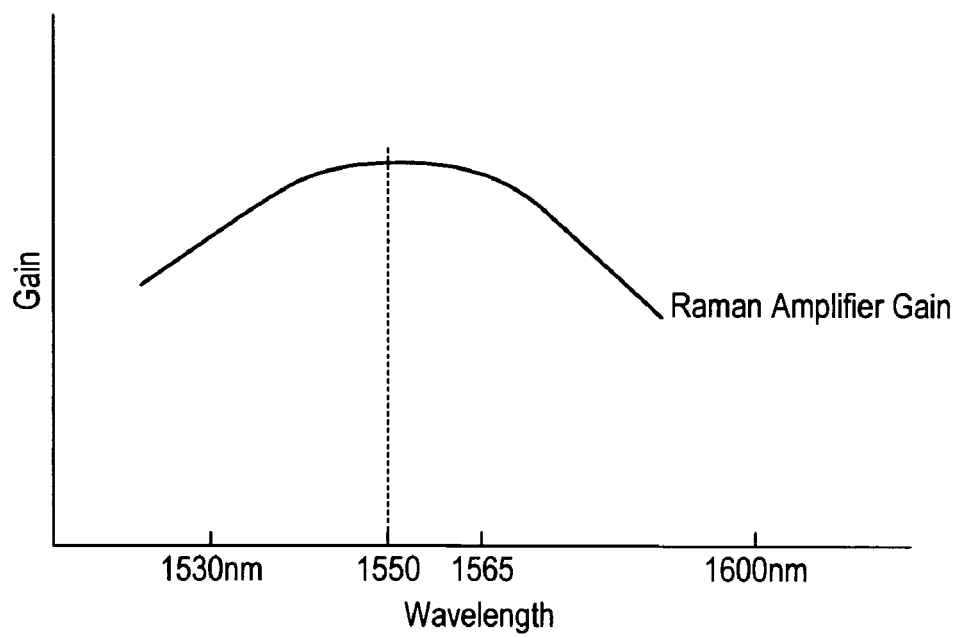
FIG. 4A is a chart illustrating the gain of an exemplary Raman optical amplifier in the 1530–1600 nm wavelength range.

FIG. 4A is a chart illustrating the gain of an exemplary Raman optical amplifier in the 1530–1600 nm wavelength range. As stated above, the Raman gain spectrum may be shifted by adjusting the frequency of the pump signal. For example, a particular optical communication system, using DWDM, for example, may tune the Raman amplifier to provide a peak gain at approximately 1550 nm. Raman amplifiers typically have a gain curve that is about 6 THz wide at FWHM. Thus, with respect to the exemplary Raman amplifier introduced above, the gain curve is relatively constant across the entire ITU grid, i.e., from approximately 1528 nm to 1563 nm, as shown in FIG. 4A.

In addition to the use of Raman amplifiers 40 as optical amplifiers 12 (FIGS. 2, 3, 5 and 6), other optical amplifiers may be used instead of a Raman amplifier, or, alternatively, in conjunction with a Raman amplifier. As stated above, the selection of an optical amplifier, or optical amplifier combination, may be dependant on the data signal wavelengths and amplification needs of the particular system. Thus, any amplifier or combination of amplifiers discussed herein, as well as any other optical amplifiers know in the art or developed in the future, are contemplated for use as optical amplifier 12 in the present system.

In one embodiment, optical amplifier 12 may be a semiconductor optical amplifier ("SOA"). A SOA laser consists of an amplifying medium located inside a resonant Fabry-Perot type cavity. The amplification function is achieved by externally pumping the energy levels of the material. In order to get only the amplification function, it is necessary to protect the device against self-oscillations generating the laser effect. This is accomplished by blocking cavity reflections using both an antireflection coating and the technique of angle cleaving the chip facets. Unlike erbium-doped fiber amplifiers, which are optically pumped, SOAs are electrically pumped by injected current.

SOAs are typically most effective in the near IR wavelengths, i.e., wavelengths from about 780 nm to about 2.5 microns. As such, a FSO system (FIGS. 2, 3, 5, and 6) that uses an optical signal 20 with a wavelength in the near IR range (e.g., 780 nm) may effectively be amplified with an SOA. It is also contemplated that optical amplifier 12 may be any other SOA that currently exists, or may be developed in the future, that effectively amplifies wavelengths outside the near IR band.

Figure 4B:
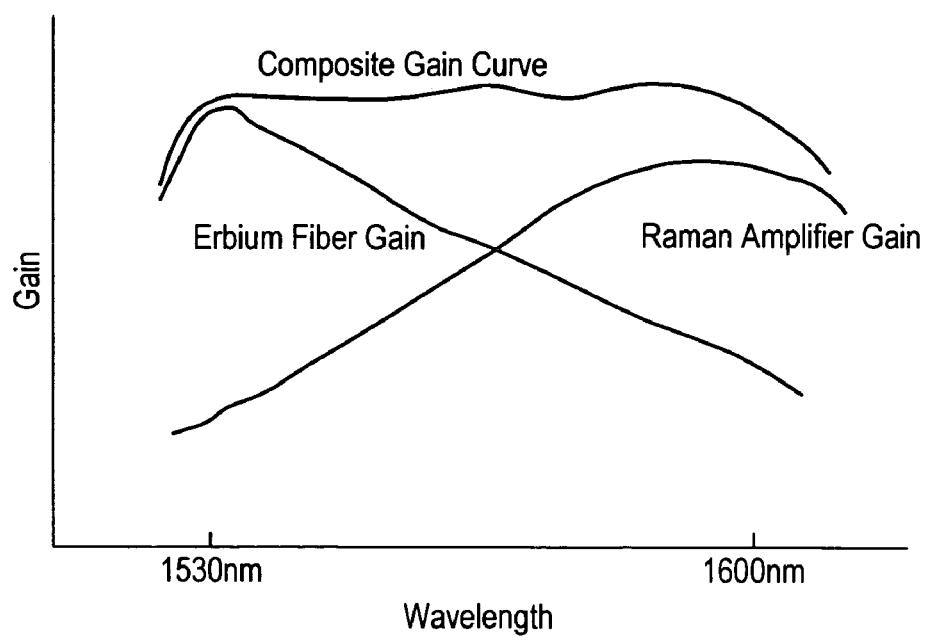
FIG. 4B is a chart illustrating the gain of an exemplary optical amplifier, providing a constant gain in the 1530–1600 nm wavelength range, comprising a combination of an EDFA and a Raman amplifier.

FIG. 4B is a chart illustrating the gain of an exemplary optical amplifier 12 comprising a combination of an EDFA and a Raman amplifier. As illustrated in FIG. 4B, the combination of amplifiers may provide a constant gain in the 1530–1600 nm wavelength range. While the gain of EDFAs tends to be highly dependant on the wavelength of the optical signal being amplified, Raman amplification, on the other hand, may produce gain over a fairly wide bandwidth as long as the pump bandwidth offsets the incident optical signal by the appropriate amount. Therefore, a properly configured combination of an EDFA and a Raman amplifier may increase the amplification bandwidth of an optical amplifier 12. For example, a typical EDFA has a peak gain at 1535 nm with the gain decreasing as the wavelength increases. A Raman amplifier, using a pump wavelength of 1500 nm, will have a peak gain at about 1600 nm, where the EDFA gain is low. As shown in FIG. 4A, the combination of the two exemplary amplifiers may provide a substantially uniform optical gain from about 1530 nm to 1600 nm. Thus, a particular system that uses a wide range of optical wavelengths (1530 nm to 1600 nm, for example) may select an optical amplifier 12 that includes a combination of optical amplifiers.

One of ordinary skill in the art will also recognize that other combinations of EDFA, Raman amplifiers, SOAs, and other optical amplifiers known in the art or developed in the future, may be used to increase the spectrum of wavelengths amplified, amplification magnitude, and amplifier efficiency.

Figure 5:
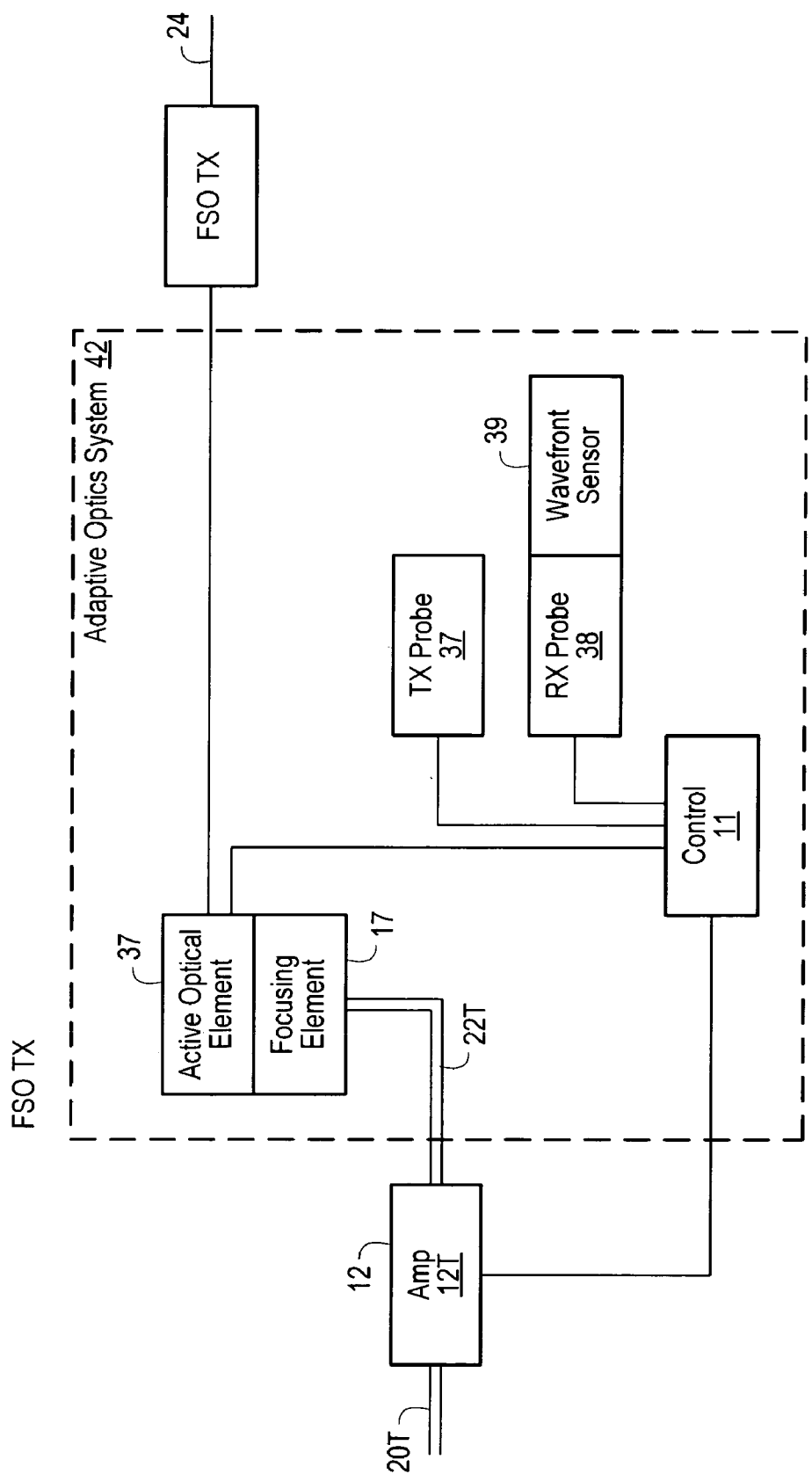
FIG. 5 is a block diagram of an adaptive optics system as used in an FSO transmitter 14.

FIG. 5 is a block diagram of an adaptive optics system as used in an FSO transmitter 14. Adaptive optics system 42 includes an active optical element 37, a control module 11, a transmit probe 37, a receive probe 38, and a wavefront sensor 39. Adaptive optics, in general, refers to optical systems which adapt to compensate for optical effects introduced by the medium between the transmitter and receiver. More specifically, in a FSO system, adaptive optics compensate for the effects of a free space medium, i.e., air. As discussed above, an optical signal will likely experience some attenuation, interference, scattering, and reflections as it travels across the free space medium. The amount of signal loss and distortion is highly dependent on the atmospheric (weather) conditions, ranging from almost no attenuation when the weather is clear to an incoherent optical signal when there is thick fog. In an FSO system, the phase of the optical signal is typically a characteristics that is significantly affected by the atmospheric conditions. Thus, one function of an adaptive optics system 42 is to compensate for phase changes caused by the free space medium.

In addition, if the propagated signal has experienced significant distortion while traveling through free space, the spot size may be much larger than when transmitted. For example, a typical optical fiber has a core diameter of about 5–9 microns. In general, if nothing is done to the received optical signal but focus the light, the smallest achievable spot size is about 50 microns. Therefore, a loss of about 16 dB is experienced in clear air. Therefore, another function of an adaptive optics system 42 is to compensate for signal spreading that occurs during transmission.

In FIG. 5, optical signal 20T is received by optical amplifier 12T, which amplifies the received signal for transmission to the FSO 14 via the adaptive optics system 42. In one embodiment, the optical amplifier 12T is a Raman optical amplifier. However, the optical amplifier 12 may be any optical amplifier that is know in the art, or any combination of such amplifiers. The fiber terminates at a focusing element 17, which focuses and directs the amplified optical signal 22T towards the active optical element 37.

The active optical element 37 may be one of many different materials, including MicroElectro-Mechanical Systems ("MEMS"), liquid crystal arrays, piezo electric mirrors, and deformable mirrors. Active optical element 37 advantageously manipulates optical signals without the need to convert the signals to electrical form.

In one embodiment, the active optical element 37 is an optical MEMS. MEMS devices typically combine electronic circuitry with mechanical structures to perform specific tasks. In an optical system, the key mechanical components are MEMS based micro-machined mirrors fabricated on silicon chips using metal-oxide semiconductor foundry processes. MEMS devices are usually from about 10 μm to 1 mm. The thickness of moveable parts on the silicon chips are usually in the order of microns. Therefore, the mass of each moveable part is very small and may be moved by applying a small force. This is appropriate for optical applications since photons have no mass. Small forces such as electrostatic force and magnetic force are suitable for the mechanical actuation. The miniature feature reduces the size and weight of the integrated components which also reduces the power consumption. In most of the cases, the electrostatic actuation only requires voltages and consumes very little currents. Furthermore, in photonic applications, the electrostatics or magnetics will not interfere with optics.

The active optical element 37 (an optical MEMS, for example) is adjustable according to instructions received from control module 11, which attempts to align the active optical element 37 so the transmitted signal 24 is exactly 180 degrees out of phase with the wavefront distortion sampled by wavefront sensor 39. The control module 11 is coupled to the active optical element 37 and controls the tip, tilt and piston position of the active optical element 37 according to inputs from transmit probe 37 and receive probe 38. In one embodiment, the tip, tilt, and piston position of the active optical element may each be controlled by inputs from the control module 11. In another embodiment, any one of the tip, tilt, or piston position are controlled by the control module 11. In yet another embodiment, the control module determines which of the tip, tilt, and/or piston position needs to be adjusted and controls one or more of the tip, tilt, and/or piston position accordingly.

Transmit probe 37 typically transmits a test optical signal into free space near the location where free space signal 24 is transmitted. Receive probe 38 includes a wavefront sensor 39 that senses certain characteristics, such as phase and intensity, of the signal transmitted from transmit probe 37. The wavefront sensor may be a shack-hartman sensor, a shearing interferometer, or any other wave front sensor that is known in the art. The phase-intensity profile from the wavefront sensor is then used by the control module 11 to determine the amount of tip, tilt and piston movement necessary for the active optical element 37 in order to compensate for the current conditions of the atmosphere.

In another embodiment, the control module 11 determines the tip, tilt and piston position of the active optical element 37 according to measurements from another FSO receiver indicating a received phase and/or intensity. Again, the control module 11 attempts to compensate for phase change caused by a transmission across free space by adjusting the active optical element so that the free space signal 24, immediately after transmission from FSO transmitter 14, is exactly 180 degrees out of phase with the phase change error measured by the receiver. For example, if the FSO receiver receives an optical signal that is 5 degrees out of phase with the expected optical signal, the control module 11 may adjust the active optical element so the optical signal that is transmitted is −5 degrees out of phase with the optical signal expected by the receiver. Therefore, the −5 degrees out of phase signal will encounter a phase change of about 5 degrees as it travels through free space and will have a phase error of near 0 degrees at the FSO receiver.

After the optical signal has been modulated by the active optical element 37, the FSO transmitter 14 transmits the signal 24 across free space. FSO transmitter 14 may further collimate the signal and direct the beam towards the intended FSO receiver.

Figure 6:
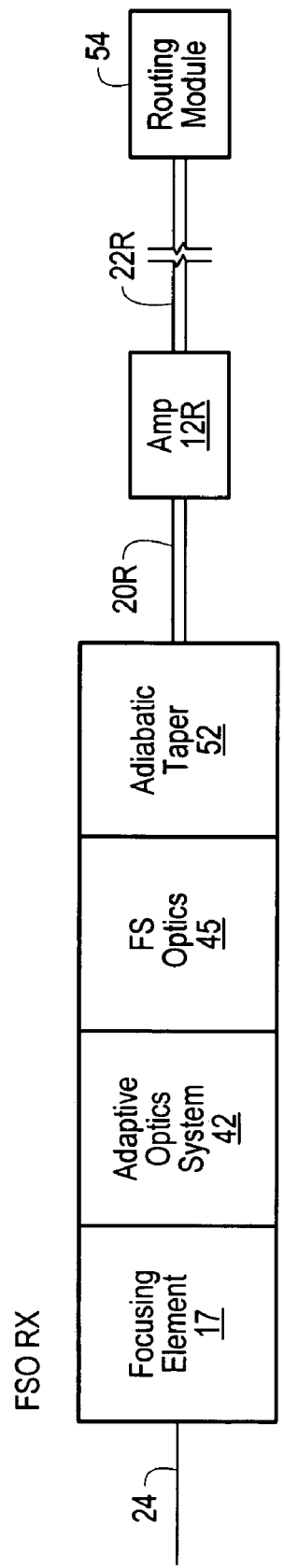
FIG. 6 is a block diagram of a FSO receiver including an adaptive optics system.

FIG. 6 is a block diagram of a FSO receiver including an adaptive optics system 42, FSO optics 45, and adiabatic taper 52. Optical signal 24 is received at focusing element 17 which focuses the signal to a smaller spot size. Focusing element 17 may be a single focusing lens, such as a parabolic lens, or alternatively, a combination of lenses that produces a focused signal on the adaptive optics system 42.

The system may also include one or more beam splitters or prisms for separating a portion of the optical signal for analysis, similar to that discussed above with reference to the transmitted signal (FIG. 2). For example, a beam splitter may be used at any point after the free space signal 24 is received at the focusing element 17. The beam splitter may be configured to direct enough of the received free space signal 24 towards an optical detector, i.e., for O-E conversion, for determination of the received signal power. This power reading may then be used as feedback to the transmitter control module 11T or receiver control module 11R (FIG. 3) in order to adjust the optical amplification magnitude of optical amplifier 12T and 12R, respectively, in accordance with the current amplification needs. The electrical signal may further be analyzed in order to determine an alignment error between the transmitter 14 and receiver 15. The alignment error may be used to automatically, or manually, adjust the position of the transmitter 14 and/or the receiver 15 in order to optimize their alignment towards one another. One of ordinary skill in the art will also recognize that the electrical 'sample' may be used for other purpose in the FSO system.

Adaptive optics system 42 may be similar to that discussed in FIG. 5, or any other adaptive optics system that is capable of measuring the characteristics of the transmission medium and compensating for phase and/or intensity attenuations in the received signal.

Adiabatic taper 52 is typically a conical shaped wave guide that focuses the optical signal to a spot size small enough to fit on fiber optic line. As stated above, a typical fiber optic core has a diameter of 9–15 microns. Thus, if the optical signal transmitted from free space optics 45 is greater than about 9 microns, the excess portion may not be transmitted directly on to the fiber optic line. In an advantageous embodiment, the taper is adiabatic so that the optical signal experiences minimal loss of power as the spot size is decreased.

The optical signal 20R likely has a lower intensity than the original optical signal from the FSO transmitter 14, due primarily to atmospheric conditions and transmission distance. Therefore, optical amplifier 12R is coupled to the fiber optic line carrying signal 20R for amplifying the intensity of the optical signal. Optical amplifier 12R may be one, or a combination of more than one, optical amplifier that is known in the art. For example, optical amplifier 12R may be a Raman amplifier, an Erbium doped amplifier, a semiconductor amplifier, or a combination of an Erbium doped amplifier and an Raman amplifier configured to provide optical gain over a larger bandwidth, for example. After amplification, the optical signal 22R is transmitted on a fiber line which may extend for a considerable distance before reaching routing module 54. Routing module 54 may include an optical router, an O-E conversion followed by a typical signal router, or a termination unit, such as an end user.

Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out the fundamental novel features of the invention as applied to various embodiments, it will be understood that various omissions and substitutions and changes in the form and details of the components illustrated may be made by those skilled in the art, without departing from the spirit or essential characteristics of the invention.

What is claimed is:

1. A free space optical communication system comprising:
    a fiber optic cable for carrying an optical signal;
    a combination optical amplifier coupled to said fiber optic cable and configured to amplify said optical signal;
    wherein said combination optical amplifier comprises at least:
        a first optical amplifier having a maximum gain at a first wavelength; and
        a second optical amplifier having a maximum gain at a second wavelength different from the first wavelength; and
    wherein the first optical amplifier and the second optical amplifier each amplify said optical signal;
    a transmitter coupled to said combination optical amplifier and configured to transmit said amplified optical signal across a free space medium; and
    an adaptive optics system for modifying the phase of said amplified optical signal before transmitting said amplified optical signal across said free space medium.

2. The free space optical communication system of claim 1, wherein said adaptive optics system comprises:
    an active optical element having an adjustable tip, tilt, and piston position, said amplified optical signal is reflected from said active optical element before transmission across said free space medium; and
    a control module operable to control said adjustable tip, tilt, and piston position of said active optical element based on an atmospheric figure.

3. The communication system of claim 2, wherein said adaptive optics system further comprises a wavefront sensor configured to sense said atmospheric figure based on characteristics of the surrounding atmosphere.

4. The free space optical communication system of claim 3, further comprising a receiver for receiving said optical signal and transmitting to said control module said atmospheric figure.

5. The free space optical communication system of claim 2 wherein said control module is coupled to said combination optical amplifier and is configured to control the magnitude of optical gain by said combination optical amplifier.

6. A free space optical communication system comprising:
    a fiber optic cable for carrying an optical signal;
    a combination optical amplifier coupled to said fiber optic cable and configured to amplify said optical signal;
    wherein said combination optical amplifier comprises at least:
        a first optical amplifier having a maximum gain at a first wavelength; and
        a second optical amplifier having a maximum gain at a second wavelength different from the first wavelength; and
    wherein the first optical amplifier and the second optical amplifier each amplify said optical signal;
    a transmitter coupled to said combination optical amplifier and configured to transmit said amplified optical signal across a free space medium; and
    a dense wavelength division multiplexing (DWDM) module coupled to said fiber optic cable and configured to receive a plurality of data signals and multiplex all of said plurality of data signals into said optical signal wherein each of said plurality of signals is transmitted at a different wavelength.

7. A free space optical communication system comprising:
    a fiber optic cable for carrying an optical signal;
    a combination optical amplifier coupled to said fiber optic cable and configured to amplify said optical signal;
    wherein said combination optical amplifier comprises at least:
        a first optical amplifier having a maximum gain at a first wavelength; and
        a second optical amplifier having a maximum gain at a second wavelength different from the first wavelength; and
    wherein the first optical amplifier and the second optical amplifier each amplify said optical signal;
    a transmitter coupled to said combination optical amplifier and configured to transmit said amplified optical signal across a free space medium;
    wherein at least one of said first and second optical amplifiers is a Raman amplifier.

8. A free space optical communication system comprising:
    a fiber optic cable for carrying an optical signal;
    a combination optical amplifier coupled to said fiber optic cable and configured to amplify said optical signal;
    wherein said combination optical amplifier comprises at least:
        a first optical amplifier having a maximum gain at a first wavelength; and
        a second optical amplifier having a maximum gain at a second wavelength different from the first wavelength; and
    wherein the first optical amplifier and the second optical amplifier each amplify said optical signal;
    a transmitter coupled to said combination optical amplifier and configured to transmit said amplified optical signal across a free space medium;
    wherein said combination optical amplifier is a combination of a Raman amplifier and an Erbium-doped amplifier.

9. A free space optical communication system comprising:
    a fiber optic cable for carrying an optical signal;
    a combination optical amplifier coupled to said fiber optic cable and configured to amplify said optical signal;
    wherein said combination optical amplifier comprises at least:
        a first optical amplifier having a maximum gain at a first wavelength; and
        a second optical amplifier having a maximum gain at a second wavelength different from the first wavelength; and
    wherein the first optical amplifier and the second optical amplifier each amplify said optical signal;
    a transmitter coupled to said combination optical amplifier and configured to transmit said amplified optical signal across a free space medium;
    wherein at least one of said first and second optical amplifiers is a semiconductor amplifier.

10. A free space optical communication system comprising:
    a combination optical amplifier configured to amplify an optical signal;
    wherein said combination optical amplifier comprises at least:
        a first optical amplifier having a maximum gain at a first wavelength; and a second optical amplifier having a maximum gain at a second wavelength different from the first wavelength; and wherein the first optical amplifier and the second optical amplifier each amplify said optical signal; and a transmitter coupled to said combination optical amplifier and configured to transmit said amplified optical signal across a free space medium, wherein said amplified optical signal is attenuated as it travels across said free space medium;

a receiver configured to receive said attenuated optical signal;

a third optical amplifier configured to amplify said attenuated optical signal; and an adiabatic taper apparatus coupled to said receiver and configured to reduce the diameter of said attenuated optical signal.

11. The free space optical communication system of claim 10, wherein said adiabatic taper apparatus reduces the diameter of said amplified attenuated optical signal.

12. A free space optical communication system comprising:

a combination optical amplifier configured to amplify an optical signal;

wherein said combination optical amplifier comprises at least:

a first optical amplifier having a maximum gain at a first wavelength; and a second optical amplifier having a maximum gain at a second wavelength different from the first wavelength; and wherein the first optical amplifier and the second optical amplifier each amplify said optical signal; and a transmitter coupled to said combination optical amplifier and configured to transmit said amplified optical signal across a free space medium, wherein said amplified optical signal is attenuated as it travels across said free space medium;

a receiver configured to receive said attenuated optical signal;

a third optical amplifier configured to amplify said attenuated optical signal;

an active optical element having an adjustable tip, tilt, and piston position; and said active optical element is configured to reflect said amplified optical signal before transmission across said free space medium.

13. The free space optical communication system of claim 12 wherein said active optical element is one or more of the following: microelectro-mechanical systems, liquid crystal arrays, piezo electric mirrors, and deformable mirrors.

14. A free space optical communication system comprising:

a combination optical amplifier configured to amplify an optical signal;

wherein said combination optical amplifier comprises at least:

a first optical amplifier having a maximum gain at a first wavelength; and a second optical amplifier having a maximum gain at a second wavelength different from the first wavelength; and wherein the first optical amplifier and the second optical amplifier each amplify said optical signal; and a transmitter coupled to said combination optical amplifier and configured to transmit said amplified optical signal across a free space medium, wherein said amplified optical signal is attenuated as it travels across said free space medium;

a receiver configured to receive said attenuated optical signal;

a third optical amplifier configured to amplify said attenuated optical signal; and a dense wavelength division multiplexing (DWDM) module coupled to said combination optical amplifier and configured to receive a plurality of data signals and multiplex all of said plurality of data signals into said optical signal before amplification by said combination optical amplifier, wherein each of said plurality of signals is transmitted at an orthogonal wavelength.

15. The free space optical communication system of claim 14, further comprising: a dense wavelength division de-multiplexing (DWDDM) module coupled to said third optical amplifier and configured to receive and de-multiplex said amplified attenuated optical signal into said plurality of data signals.

16. A free space optical communication system comprising:

a combination optical amplifier configured to amplify an optical signal;

wherein said combination optical amplifier comprises at least:

a first optical amplifier having a maximum gain at a first wavelength; and a second optical amplifier having a maximum gain at a second wavelength different from the first wavelength; and wherein the first optical amplifier and the second optical amplifier each amplify said optical signal; and an active optical element with an adjustable tip, tilt, and piston position;

a control module configured to control said tip, tilt, and piston position of said active optical element;

said control module comprises a transmit probe for transmitting a test optical signal and a receive probe for analyzing said test optical signal in a free space medium, said control module determines said tip, tilt, and piston position based on the analysis by said receive probe; and a transmitter configured to transmit said amplified optical signal towards said active optical element so that said amplified optical signal reflected from said active optical element is modified according to said analysis by said receive probe.

17. The free space optical communication system of claim 16 wherein said receive probe is configured to determine a phase angle of said test optical signal and said tip, tilt, and piston position of said active optical element are adjusted so that said reflected optical signal is 180° out of phase from said phase angle of said test optical signal.

18. The free space optical communication system of claim 17 wherein said active optical element is one or more of the following: microelectro-mechanical systems, liquid crystal arrays, piezo electric mirrors, and deformable mirrors.

19. A free space optical communication system comprising:

a fiber optic cable for carrying an optical signal;

a first optical amplifier coupled to said fiber optic cable and configured to amplify said optical signal;

a transmitter coupled to said first optical amplifier and configured to transmit said amplified optical signal across a free space medium, wherein said amplified optical signal is attenuated as it travels across said free space medium;
a receiver configured to receive said attenuated optical signal; and
a second optical amplifier configured to amplify said attenuated optical signal;
wherein said second optical amplifier comprises at least:
a third optical amplifier having a maximum gain at a first wavelength; and
a fourth optical amplifier having a maximum gain at a second wavelength different from the first wavelength; and
wherein the third optical amplifier and the fourth optical amplifier each amplify said attenuated optical signal.

20. The free space optical communication system of claim 19, said transmitter further comprising: an adaptive optics system for modifying the phase of said amplified optical signal before transmitting said amplified optical signal across said free space medium.

21. The free space optical communication system of claim 20, wherein said adaptive optics system comprises:
an active optical element having an adjustable tip, tilt, and piston position, said amplified optical signal is reflected from said active optical element before transmission across said free space medium; and
a control module operable to control said adjustable tip, tilt, and piston position of said active optical element based on an atmospheric figure.

* * * * *